US 11,789,335 B2

United States Patent
Faulhaber et al.

(10) Patent No.: US 11,789,335 B2
(45) Date of Patent: Oct. 17, 2023

(54) RAMAN DEPRESSING FIBER

(71) Applicant: Lumentum Operations LLC, San Jose, CA (US)

(72) Inventors: Richard D. Faulhaber, San Carlos, CA (US); Martin H. Muendel, Oakland, CA (US); Patrick Gregg, Sunnyvale, CA (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 17/453,441

(22) Filed: Nov. 3, 2021

(65) Prior Publication Data
US 2023/0034097 A1 Feb. 2, 2023

Related U.S. Application Data

(60) Provisional application No. 63/203,772, filed on Jul. 30, 2021.

(51) Int. Cl.
*G02F 1/365* (2006.01)
*G02F 1/35* (2006.01)

(52) U.S. Cl.
CPC ............ *G02F 1/365* (2013.01); *G02F 1/3536* (2013.01)

(58) Field of Classification Search
None
See application file for complete search history.

(56) References Cited

U.S. PATENT DOCUMENTS

| | | | | |
|---|---|---|---|---|
| 7,184,623 B2* | 2/2007 | Cai | ........................ | G02B 6/2552 359/333 |
| 7,286,733 B2* | 10/2007 | Watanabe | ............ | G02B 6/2808 385/50 |
| 8,433,168 B2* | 4/2013 | Filippov | ........... | C03B 37/02763 385/127 |
| 9,158,070 B2* | 10/2015 | Farmer | .................... | G02B 6/14 |
| 9,484,706 B1* | 11/2016 | Koponen | ............ | H01S 3/06708 |
| 10,429,589 B2* | 10/2019 | Bookbinder | ......... | G02B 6/0281 |
| 2013/0301663 A1* | 11/2013 | Clowes | ............... | H01S 3/08059 372/6 |

* cited by examiner

*Primary Examiner* — Rhonda S Peace
(74) *Attorney, Agent, or Firm* — Harrity & Harrity, LLP

(57) ABSTRACT

In some implementations, a monolithic optical fiber may comprise a tapered core having a first diameter at an input end and a second diameter at an output end. The tapered core may comprise a first tapered region at the input end, a second tapered region at the output end, and a central region having a constant diameter that is larger than the first diameter and the second diameter. The first tapered region expands monotonically from the first diameter to the constant diameter of the central region along a length of the first tapered region, and the second tapered region contracts monotonically from the constant diameter of the central region to the second diameter along a length of the second tapered region. The monolithic optical fiber may be used as a delivery fiber to deliver a laser beam from a fiber laser engine to a process head.

20 Claims, 4 Drawing Sheets

RAMAN DEPRESSING FIBER

CROSS-REFERENCE TO RELATED APPLICATION

This patent application claims priority to U.S. Provisional Patent Application No. 63/203,772, filed on Jul. 30, 2021, and entitled "RAMAN DEPRESSING FIBER." The disclosure of the prior application is considered part of and incorporated by reference into this patent application.

TECHNICAL FIELD

The present disclosure relates generally to a delivery fiber that may be used in industrial applications and to an optical fiber designed to suppress stimulated Raman scattering (SRS) gain and maintain laser brightness along the optical fiber.

BACKGROUND

In physics, the term scattering is generally used to describe various physical processes where moving particles or radiation in some form (e.g., light or sound) are forced to deviate from a straight trajectory by localized non-uniformities in a medium through which the particles or radiation pass. For example, Raman scattering (or the Raman effect) is the inelastic scattering of photons by matter, meaning that there is both an exchange of energy and a change in the direction that light is traveling. Raman scattering typically involves energy being gained by a molecule as incident photons from a visible laser are shifted to lower energy.

SUMMARY

In some implementations, a monolithic optical fiber comprises a tapered core having an input end and an output end; and a cladding surrounding the tapered core, wherein the tapered core comprises a first tapered region at the input end, a second tapered region at the output end, and a central region provided between the first tapered region and the second tapered region, wherein the first tapered region has a first core diameter at the input end, the second tapered region has a second core diameter at the output end, and the central region has a third core diameter that is larger than the first core diameter and the second core diameter, and wherein the first tapered region and the second tapered region each has the third core diameter at an interface with the central region.

In some implementations, an optical assembly comprises an optical fiber comprising a core and a cladding surrounding the core, wherein the core has a constant core diameter and the cladding has a constant cladding diameter that is larger than the constant core diameter; a first nonlinearity reduction device spliced to the optical fiber at an input end; and a second nonlinearity reduction device spliced to an output end of the optical fiber.

In some implementations, an optical assembly comprises a fiber laser engine; a process head; and a monolithic delivery fiber, connected to the fiber laser engine and to the process head, to deliver a laser beam from the fiber laser engine to the process head, wherein the delivery fiber comprises: a tapered core having an input end and an output end; and a cladding surrounding the tapered core, wherein the tapered core comprises a first tapered region at the input end, a second tapered region at the output end, and a central region provided between the first tapered region and the second tapered region, and wherein the first tapered region has an input diameter at the input end, the second tapered region has an output diameter at the output end, and the central region has a constant diameter that is larger than the input diameter and the output diameter.

DETAILED DESCRIPTION

The following detailed description of example implementations refers to the accompanying drawings. The same reference numbers in different drawings may identify the same or similar elements.

Laser material processing has many advantages, including high productivity, a non-contact nature of processing, improved quality, and high precision and mobility of a laser beam delivery point. Lasers are used in various industrial applications, including cutting, drilling, welding, brazing, surface annealing, alloying, and/or hardening, among other examples. For example, in an industrial laser application, a beam delivery system often includes an optical fiber used to deliver a high-power and/or a high-intensity laser beam to a target.

Figure 1:
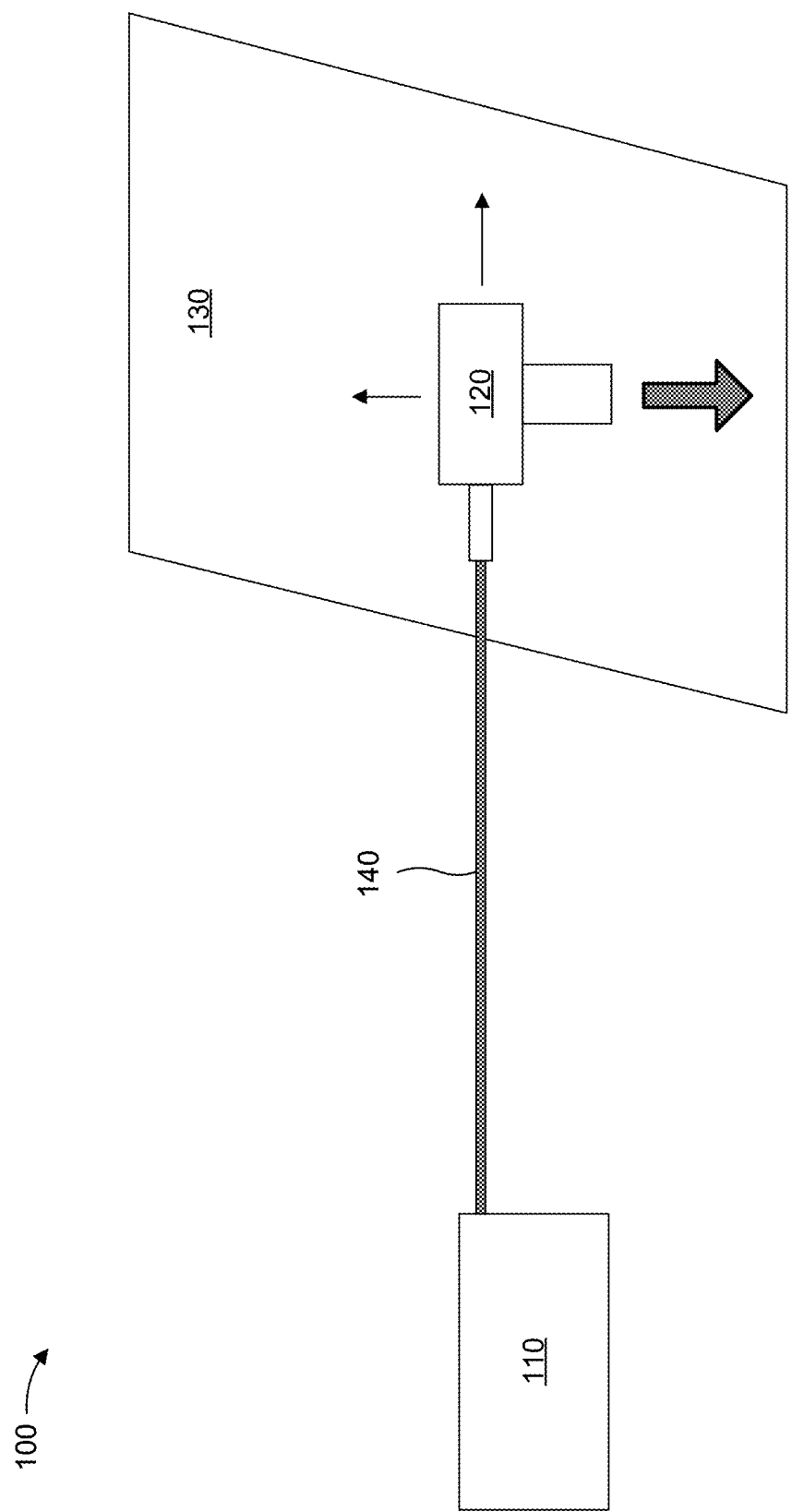
FIG. 1 is a diagram illustrating an example industrial beam delivery system.

For example, FIG. 1 is a diagram illustrating an example industrial beam delivery system 100. As shown in FIG. 1, the industrial beam delivery system 100 may include a fiber laser engine 110 (e.g., a multi-kilowatt (kW) fiber laser engine) connected to a process head 120 in an application area 130 (e.g., a cutting and/or welding area) through a delivery fiber 140 that typically has a length in a range from approximately ten (10) to fifty (50) meters (m). The delivery fiber 140 may be provided in a reinforced cable that is pluggable on an input end and an output end, and the process head 120 is an optical assembly that includes a receptacle to receive the input end of delivery fiber 140, optics to project laser power, and any laser-based processing accessories that may be needed, such as assist-gas ports. The fiber laser engine 110 may transmit a laser into an optical coupler unit, either through free space or through a separate optical fiber, and the optical coupler unit may launch the laser into the delivery fiber 140. Accordingly, the delivery fiber 140 transmits the laser to the process head 120, which may project the laser onto a workpiece in the application area 130 to perform a desired laser material processing task The delivery fiber 140 used in the industrial beam delivery system 100 typically has a long length (e.g., at least 10 m). For example, the long length may be needed because the process head 120 is typically accelerating quickly in a large machine and a gantry that moves the process head 120 within the application area 130 to direct the laser toward material to be cut, welded, engraved, and/or otherwise processed cannot be burdened by the weight of the fiber laser engine 110 (e.g., a movable beam delivery system allows the laser to be moved within the application area 130 without having to move the fiber laser engine 110, which may be very heavy). Furthermore, the long length of the delivery fiber 140 may be advantageous in that the fiber laser engine 110 can be placed in a well-protected area with good access for service operations, rather than placing the fiber laser engine 110 close to the application area 130. However, the long length of the delivery fiber 140 may pose various challenges, including optical power losses, pulse broadening, and/or nonlinear limitations. For example, higher laser power generally leads to faster material processing, which creates a demand for higher and higher laser powers in industrial applications (e.g., currently between 15-20 kW). As the laser power increases, however, delivering laser light with a high brightness and a high power through tens of meters of optical fiber becomes increasingly challenging due to problematic nonlinear effects such as stimulated Raman scattering (SRS).

In particular, SRS is a nonlinear optical effect where energy from an optical pump beam is converted to a longer wavelength via vibrational and/or rotational modes or phonons being excited in the molecules of a glass medium. While this process may be useful for certain applications (e.g., to turn an optical fiber into a Raman amplifier or a tunable Raman laser), SRS is undesirable for multi-kW continuous wave (CW) industrial fiber lasers or quasi-CW kW fiber lasers used in the cutting and welding industries. For example, in industrial applications, SRS may transfer energy from one channel to a neighboring channel and/or limit the power that can propagate without unwanted loss and/or heating, which may negatively impact the industrial processes and/or cause damage to equipment. As power levels for industrial kW fiber lasers continue to increase, SRS becomes more problematic, and a need arises for techniques to suppress SRS.

In general, the degree of SRS present in an optical fiber may be determined by a Raman gain exponent, which is a metric for the amount of amplification occurring from SRS in a given length of optical fiber. The Raman gain exponent, arising in an optical fiber, is determined by multiplying a gain coefficient, gR, by a signal intensity integrated along a length of the optical fiber, where signal intensity is taken by dividing the power by the geometric area, as follows:

$$\text{Raman Gain} = gR \frac{\text{Power}}{\text{Area}}$$

Figure 2:
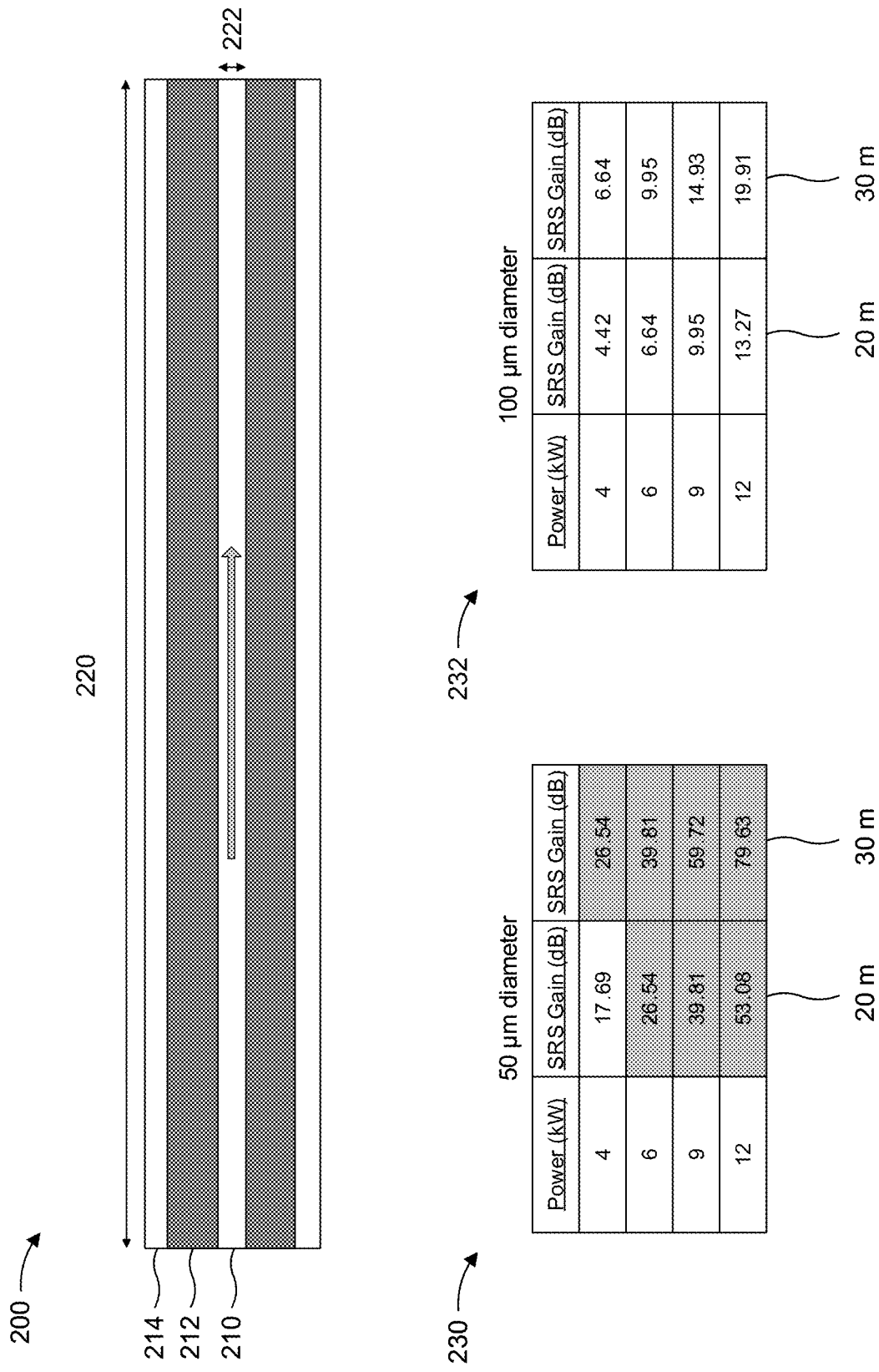
FIG. 2 is a diagram illustrating an example delivery fiber.

The gain coefficient, gR, may have a value of approximately $10^{-13}$ m/W, and is dependent on the particular dopants in the glass. For example, FIG. 2 illustrates an example standard delivery fiber 200 that includes a core 210, a cladding 212 surrounding the core 210, and a buffer 214 surrounding the cladding 212. In general, the standard delivery fiber 200 may have a length 220 of at least 10 m and a constant diameter 222. As described herein, the effects from SRS in the standard delivery fiber 200 are explained in a context where the length 220 of the standard delivery fiber is either 20 m or 30 m and the diameter 222 of the core 210 is either 50 micrometers (μm) or 100 μm, although other suitable values for the length 220 and the core diameter 222 are contemplated. As shown in FIG. 2, table 230 indicates the SRS gain (in decibels (dB)) that may occur when the diameter 222 of the core 210 in the standard delivery fiber 200 has is 50 μm. In particular, the middle column in table 230 indicates the SRS gain that may occur at different power levels (e.g., at 4 kW, 6 kW, 9 kW, and 12 kW) given a length 220 of 20 m and a core diameter 222 of 50 μm, and the right-most column in table 230 indicates the SRS gain that may occur when the length 220 is 30 m and the core diameter 222 is 50 μm. As shown in table 230, power levels above 4 kW and lengths greater than 20 m generate an SRS gain that fails to satisfy a performance threshold (e.g., a 20 decibel (dB) limit) considered practical for the 50 μm core diameter 222 (e.g., shown by shaded boxes in table 230).

Accordingly, using the standard delivery fiber 200 with a fixed power and a fixed length, the solution that is typically adopted to mitigate SRS is to increase the core diameter (e.g., to 100 μm), which decreases the SRS gain by increasing the effective area along the length 220 of the standard delivery fiber 200 (e.g., increasing the value of the denominator in the above expression, resulting in a decreased signal intensity). For example, table 232 provides SRS gain values for the standard delivery fiber 200 given a core diameter 222 of 100 μm and a length 220 of either 20 m or 30 m. As shown, relative to the 50 μm core diameter 222, the SRS gain values are significantly lower when the core diameter 222 is increased to 100 μm. However, increasing the core diameter 222 is a suboptimal solution because the (smaller) 50 μm core diameter 222 may be more desirable for certain applications (e.g., industrial applications that require a tightly focused small spot size). Furthermore, as power levels increase to 15-20 kW (or higher), a standard delivery fiber 200 with a core diameter 222 of 100 μm will also experience increased SRS, which would then demand further increases of the core diameter 222 to 200 μm (or higher).

Some implementations described herein relate to a Raman depressing (or suppressing) fiber that may reduce a Raman gain without sacrificing brightness or requiring a change to a core diameter that may result in an undesirable size spot being delivered to an application area (e.g., via a process head). For example, in some implementations, the Raman depressing fiber may be a monolithic (e.g., single piece) delivery fiber that maintains brightness and reduces SRS gain in high power kW applications. The Raman depressing fiber can deliver a small spot size (e.g., 50 μm) and high power intensity over long fiber lengths (e.g., 10-50 meters), which would otherwise be limited by the SRS gain. The Raman depressing fiber described herein is also compatible with current fiber manufacturing processes and/or cabling process, whereby the Raman depressing fiber is backwards compatible with existing technologies. For example, as described herein, the Raman depressing fiber may deliver high brightness, high power laser light through tens of meters of optical fiber with reduced nonlinear effects (e.g., reduced SRS, self-phase modulation, four wave mixing, and/or stimulated Brillouin scattering) by reducing the power density and maintaining brightness along the majority of the fiber length, and in a manner compatible with standard cabling techniques, connectorizing techniques, and/or the like.

Figure 3:
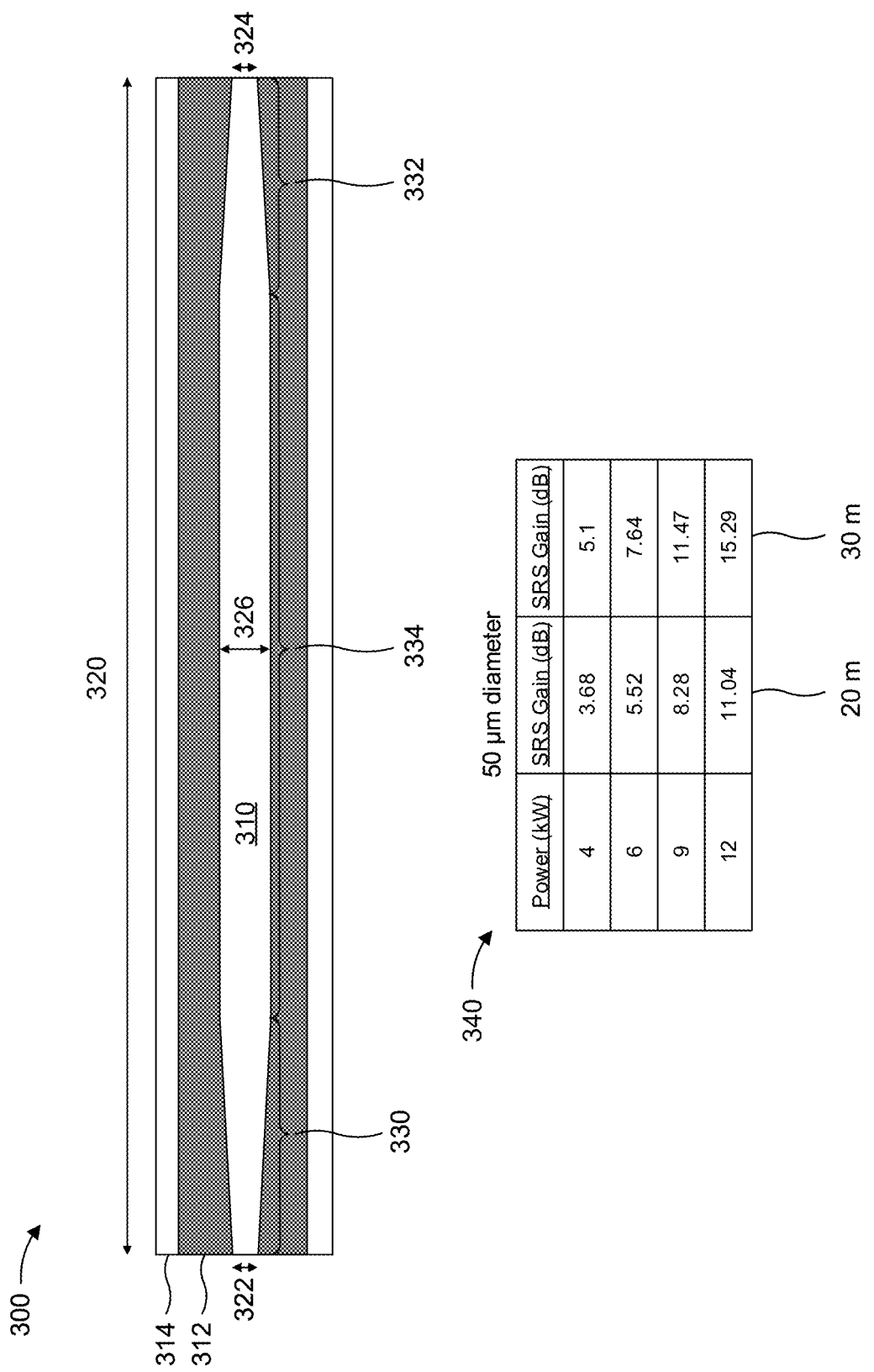
FIG. 3 is a diagram illustrating an example implementation of a Raman depressing fiber that may mitigate stimulated Raman scattering (SRS) or other nonlinear effects.

FIG. 3 illustrates an example implementation of a Raman depressing fiber 300 that may mitigate SRS or other nonlinear effects. For example, as described above, the easiest way to reduce Raman gain in an optical fiber at a given power level and a given length is to increase the effective area along a length of the fiber (e.g., increasing the denominator in the above expression to decrease the Raman gain exponent arising in the optical fiber). However, as further described above with reference to FIG. 2, increasing the effective area (e.g., by increasing the core diameter) may sacrifice brightness and increase the spot size delivered by the optical fiber. In contrast, as shown in FIG. 3, the Raman depressing fiber 300 is monolithic and has a tapered core 310 on both an input end and an output end of the cable. As further shown, a cladding 312 surrounds the tapered core 310, and a diameter 326 of the cladding 312 may be constant or the diameter 326 of the cladding 312 may have a tapered geometry that corresponds to a shape of the tapered core 310. In some implementations, the core 310 of the Raman depressing fiber 300 may have a tapered length on the input end and the output end that is adiabatic for light traveling through the core 310. For example, the Raman depressing fiber 300 as shown in FIG. 3 may have a tapered length of approximately 2 m on the input end and approximately 2 m the output end, although other suitable values for the tapering length are contemplated (e.g., adiabaticity for the light traveling through the core 310 may be achieved at a tapering length of approximately 100-200 millimeters (mm)). Furthermore, in some implementations, the core 310 may include a central diameter 326 over a majority of a length 320 of the Raman depressing fiber 300 that is generally larger than a diameter 322 of the core 310 at the input end and a diameter 324 of the core 310 at the output end, where the diameters 322, 324 may be equal or different. For example, in some implementations, a ratio of the central diameter 326 to the diameter 322 at the input end and/or the diameter 324 at the output end may be in a range from approximately 1.5 to 3.5 (e.g., the central diameter 326 may be approximately 2× the diameter 322 at the input and/or the diameter 324 at the output end, such as 125 μm in an example where the diameter 322 is 50 μm at the input and the diameter 324 is 50 μm at the output end). As described herein, the Raman depressing fiber 300 may maintain brightness, deliver a more desirable smaller spot size, and provide a drop-in replacement for existing fibers based on the monolithic design.

As described herein, the Raman depressing fiber 300 may suppress SRS (e.g., reduce a Raman gain) without increasing spot size or sacrificing brightness by providing a tapered core 310 that increases the effective area of the Raman depressing fiber 300 along the length 320 of the Raman depressing fiber 300. Furthermore, in addition to suppressing SRS gain, the Raman depressing fiber 300 may have one or more design parameters to maintain brightness of a laser traveling along the length 320 of the Raman depressing fiber 300 (e.g., through the tapered core 310). For example, in some implementations, the one or more design parameters may include a length of an up taper region 330 at the input end of the Raman depressing fiber 300, a length of a down taper region 332 at the output end of the Raman depressing fiber 300, and/or a taper ratio of the Raman depressing fiber 300 (e.g., a ratio of the diameter 326 of the core 310 in an un-tapered central region 334 of the Raman depressing fiber 300 to the diameter 322 of the core 310 at the input end and/or the diameter 324 of the core 310 at the output end). In some implementations, the up taper length 330, the down taper length 332, and/or the taper ratio may have values that are adiabatic for the light of the laser traveling through the core 310. For example, the up taper length 330 at the input end of the Raman depressing fiber 300 and the down taper length 332 at the output end of the Raman depressing fiber 300 may be in a range from approximately 100 mm to 2 m, which may be a sufficient length to be adiabatic for the light (e.g., the length(s) for the up taper and the down taper provide transitions that do not cause brightness degradation or additional loss). Increasing the taper length(s) 330, 332 to values greater than 2 m generally does not improve brightness but may cause more loss to SRS. With respect to the taper ratio of the Raman depressing fiber, the taper ratio may have a value in a range from approximately 1.5 to 3.5, which may be constrained by a minimum supportable numerical aperture (NA) of the Raman depressing fiber 300. For example, if the taper ratio were to be increased significantly and the NA of the light in the Raman depressing fiber 300 were to decrease, brightness degradation may occur from micro and/or macro bending, high order mode (HOM) excitation, and/or other effects. The brightness degradation effects may become problematic as the NA has a value of approximately 0.05, and a taper ratio in the range provided above (e.g., a diameter change of approximately 2× or 2.5×) may counteract the problematic brightness degradation effects.

Accordingly, as shown in FIG. 3 and described herein, a Raman depressing fiber 300 may include a tapered core 310 having an input end and an output end and a cladding 312 surrounding the tapered core 310. In some implementations, as shown in FIG. 3, a buffer 314 (e.g., a conduit contained within a fiber optic cable) may encapsulate the Raman depressing fiber 300 to provide mechanical isolation, protection against damage, and/or other functions (e.g., fiber identification). In some implementations, as shown, the tapered core 310 includes a first tapered region 330 (e.g., an up taper region) at the input end, a second tapered region 332 (e.g., a down taper region) at the output end, and a central region 334 provided between the first tapered region 330 and the second tapered region 332. In some implementations, the first tapered region 330 has a first diameter 322 at the input end, the second tapered region 332 has a second diameter 324 at the output end, and the central region 334 has a third (central) diameter 326 that is larger than the first diameter 322 and the second diameter 324. In some implementations, the first diameter 322 may be equal to the second diameter 324, or the first diameter 322 and the second diameter 324 may have different values (e.g., when the Raman depressing fiber 300 is used in an application where the output spot size needs to be smaller or larger than the input laser). In some implementations, the first tapered region 330 and the second tapered region 332 each has the third diameter 326 at an interface with the central region 334.

In some implementations, in order to maintain brightness for light traveling through the tapered core 310, the first tapered region 330 and the second tapered region 332 have respective lengths that are adiabatic for the light traveling through the tapered core 310 (e.g., in a range from approximately 100 mm to 2 m). Furthermore, in some implementations, the first tapered region 330 may expand monotonically (e.g., linearly or parabolically) along a length of the first tapered region 330, and the second tapered region 332 may contract monotonically (e.g., linearly or parabolically) along a length of the second tapered region 332. In some implementations, the first diameter 322 at the input end and the second diameter 324 at the output end are in a range from 50 to 200 μm, although the first diameter 322 and/or the second diameter 324 may have a larger value for higher powers that may be more susceptible to Raman gain. Furthermore, as described herein, the first diameter 322 may be equal to the second diameter 324, or the first diameter 322 and the second diameter 324 may have different values. In some implementations, the Raman depressing fiber 300 may be monolithic, which allows the Raman depressing fiber 300 to be used as a drop-in replacement for an existing delivery fiber with a constant core diameter. In some implementations, as shown in FIG. 3, the cladding 312 may have a constant diameter along the length 320 of the Raman depressing fiber 300 (e.g., at least 10 m, and typically in a range from approximately 10 m to approximately 50 m). Alternatively, the cladding 312 may have a tapered geometry that corresponds to a shape of the tapered core 310. Furthermore, in order to minimize brightness degradation and/or preserve brightness, a taper ratio of the diameter 326 in the central region 334 to one or more of the first diameter 322 at the input end or the second diameter 324 at the output end may be in a range from 1.5 to 3.5 (e.g., depending on the minimum supportable NA).

In some implementations, the Raman depressing fiber 300 may therefore have various design characteristics that may suppress SRS without requiring an increased spot size or sacrificing brightness. For example, referring to FIG. 3, table 340 indicates the SRS gain that may be experienced in a design where the diameters 322, 324 of the core 310 at the input and output ends is 50 μm, the diameter 326 in the central region 334 is 125 μm (e.g., resulting in a taper ratio of 2.5×), and the up taper region 330 and the down taper region 332 have lengths of approximately 2 m. For example, in FIG. 2, table 230 provides values of SRS gain (in dB) for a standard 20 m delivery fiber and a standard 30 m delivery fiber with a core having a constant 50 μm diameter, which results in an amount of Raman gain that fails to satisfy a threshold (e.g., exceeds 20 dB) at power levels above 4 kW and/or lengths greater than 20 m, which can only be counteracted in a standard delivery fiber by increasing the constant core diameter (e.g., to 100 μm, as shown by table 232). In contrast, as shown by table 340, the Raman depressing fiber 300 may exhibit significantly less SRS without having to increase the input diameter 322 or the output diameter 324 to a value larger than 50 μm. Accordingly, relative to the standard delivery fiber shown in FIG. 2 (e.g., where the core 210 and the cladding 212 have constant diameters), the Raman depressing fiber 300 with a tapered core 310 on both the input end and the output end dramatically decreases the SRS gain while delivering the desired spot size to the application. For example, comparing table 230 in FIG. 2 and table 340 shown in FIG. 3, the design of the Raman depressing fiber 300 decreases the SRS gain from 17.69 dB to 3.68 dB at a length of 20 m and a power of 4 kW, from 26.54 dB to 5.12 dB at a length of 30 m and a power of 4 kW, from 26.54 dB to 5.52 dB at a length of 20 m and a power of 6 kW, and from 39.81 dB to 7.64 dB at a length of 30 m and a power of 6 kW, among other examples. Accordingly, as described herein, the Raman depressing fiber 300 may be used in any suitable application where there is a need to suppress SRS over a long fiber length (e.g., the Raman depressing fiber 300 may be used as a feeding fiber, a process fiber, a passive fiber in a laser and/or combiner, and/or in other industries outside high power fiber lasers). Furthermore, in addition to having applications to reduce SRS gain in CW lasers as described herein, the Raman depressing fiber 300 may be used as a delivery fiber for other pulsed laser applications (e.g., in nanosecond, picosecond, and/or femtosecond ranges). Further, the Raman depressing fiber 300 may be used to reduce any nonlinear effects that may be associated with high peak power densities, where such nonlinear effects may include SRS, self-phase modulation, four wave mixing, and/or stimulated Brillouin scattering, among other examples.

As indicated above, FIG. 3 is provided as an example. Other examples may differ from what is described with regard to FIG. 3.

Figure 4:
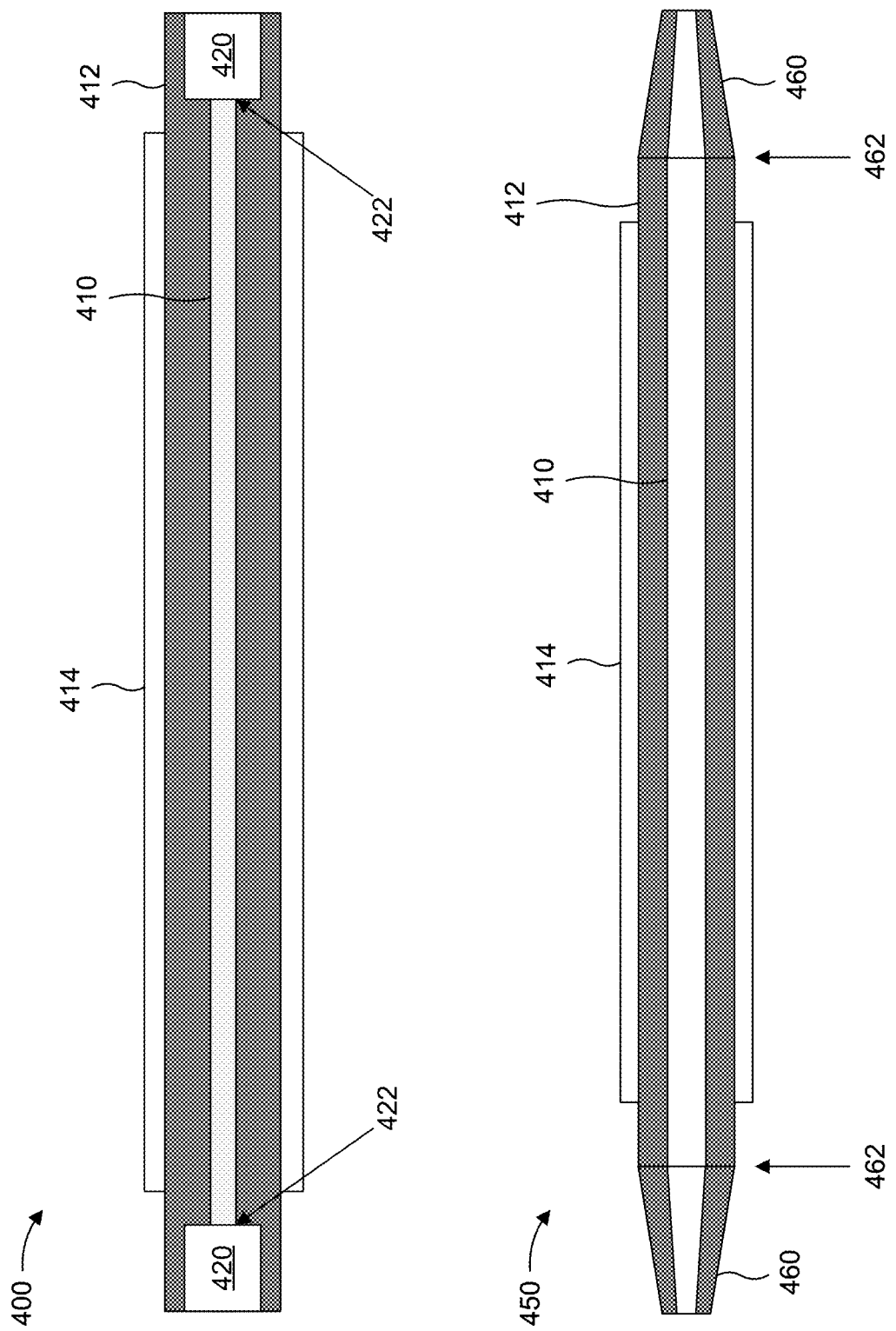
FIG. 4 is a diagram illustrating example implementations of fiber assemblies that may mitigate SRS or other nonlinear effects.

FIG. 4 illustrates example implementations of fiber assemblies 400, 450 that may mitigate SRS or other nonlinear effects. As shown, fiber assemblies 400, 450 may each include a core 410, a cladding 412 surrounding the core 410, and a buffer 414 to encapsulate the core 410 and the cladding 412, which may have constant diameters. Furthermore, as shown, fiber assemblies 400, 450 may include nonlinearity reduction devices at opposing ends of the core 410 to mitigate SRS or other nonlinear effects (e.g., SRS, self-phase modulation, four wave mixing, and/or stimulated Brillouin scattering, among other examples). For example, rather than designing the core 410 to have an up taper and a down taper to increase the effective area (e.g., as shown in FIG. 3), fiber assembly 400 may include ¼ pitch graded index (GI) fibers 420 spliced to the input end and the output end of a standard delivery fiber at respective splice points 422. Alternatively, fiber assembly 450 may include discretely tapered ends 460 (e.g., taper components that have a maximum length of approximately 30 mm) to mitigate SRS or other nonlinear effects, with the tapered ends 460 spliced to the input end and the output end of a standard delivery fiber at respective splice points 462. For example, as shown, the tapered ends 460 have the same diameter as the core 410 at the respective splice points 462, and have smaller input and output diameters to increase the effective area and thereby suppress nonlinear effects without delivering an undesirable spot size or degrading brightness.

As indicated above, FIG. 4 is provided as an example. Other examples may differ from what is described with regard to FIG. 4.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A monolithic optical fiber, comprising:
a tapered core having an input end and an output end; and
a cladding surrounding the tapered core,
   wherein the tapered core comprises a first tapered region at the input end, a second tapered region at the output end, and a central region provided between the first tapered region and the second tapered region,
   wherein the first tapered region has a first core diameter at the input end, the second tapered region has a second core diameter at the output end, and the central region has a third core diameter that is larger than the first core diameter and the second core diameter,
   wherein the first tapered region and the second tapered region each has the third core diameter at an interface with the central region,
   wherein the first core diameter at the input end and the second core diameter at the output end are in a range from 50 to 200 micrometers, and
   wherein the cladding has a constant cladding diameter over the first tapered region, the central region, and the second tapered region.

2. The monolithic optical fiber of claim 1, wherein the first tapered region and the second tapered region have a length that is adiabatic for light traveling through the tapered core.

3. The monolithic optical fiber of claim 1, wherein the first tapered region expands monotonically along a length of the first tapered region, and wherein the second tapered region contracts monotonically along a length of the second tapered region.

4. The monolithic optical fiber of claim 1, wherein the first core diameter is equal to the second core diameter.

5. The monolithic optical fiber of claim 1, wherein a nonlinearity parameter associated with a laser beam delivered through the monolithic optical fiber satisfies a threshold that is based on one or more of a power level of the laser beam or a value of the first core diameter or the second core diameter.

6. The monolithic optical fiber of claim 1, having a length of at least ten meters.

7. The monolithic optical fiber of claim 1, wherein a taper ratio of the third core diameter in the central region to one or more of the first core diameter at the input end or the second core diameter at the output end is in a range from 1.5 to 3.5.

8. An optical assembly, comprising:
an optical fiber comprising a core,
   wherein the core has a constant core diameter;
a first nonlinearity reduction device spliced to an input end of the optical fiber,
   wherein the first nonlinearity reduction device is a first tapered component that has an input diameter at a first tapered end and a first core diameter equal to the constant core diameter at a first splice point where the first nonlinearity reduction device is spliced to the input end of the optical fiber;
a second nonlinearity reduction device spliced to an output end of the optical fiber,
   wherein the second nonlinearity reduction device is a second tapered component that has an output diameter at a second tapered end and the first core diameter equal to the constant core diameter at a second splice point where the second nonlinearity reduction device is spliced to the output end of the optical fiber,
   wherein the input diameter and the output diameter are each in a range from 50 to 200 micrometers; and
a cladding surrounding the core, the first nonlinearity reduction device, and the second nonlinearity reduction device,
   wherein the cladding has a constant cladding diameter over the core, the first nonlinearity reduction device, and the second nonlinearity reduction device, and
   wherein the constant cladding diameter is larger than the constant core diameter.

9. The optical assembly of claim 8, wherein the first nonlinearity reduction device and the second nonlinearity reduction device are tapered components that have a first core diameter equal to the constant core diameter at respective splice points where the first and second nonlinearity reduction devices are spliced to the optical fiber and respective input or output diameters that are smaller than the constant core diameter.

10. The optical assembly of claim 8, wherein a nonlinearity parameter associated with a laser beam delivered through the optical assembly satisfies a threshold that is based on one or more of a power level of the laser beam or a length of the optical assembly.

11. The optical assembly of claim 10, wherein the nonlinearity parameter includes a Raman gain, self-phase modulation, four wave mixing, or stimulated Brillouin scattering.

12. The optical assembly of claim 8, wherein a nonlinearity parameter associated with a laser beam delivered through the optical assembly satisfies a threshold that is based on a value of the input diameter or the output diameter.

13. The optical assembly of claim 8, wherein the input diameter is equal to the output diameter.

14. The optical assembly of claim 8, wherein a taper ratio of the constant core diameter in the optical fiber to one or more of the input diameter at the first tapered end or the output diameter at the second tapered end is in a range from 1.5 to 3.5.

15. An optical assembly, comprising:
a fiber laser engine;
a process head; and
a monolithic delivery fiber, connected to the fiber laser engine and to the process head, to deliver a laser beam from the fiber laser engine to the process head, wherein the monolithic delivery fiber comprises:
   a tapered core having an input end and an output end; and
   a cladding surrounding the tapered core,
      wherein the tapered core comprises a first tapered region at the input end, a second tapered region at the output end, and a central region provided between the first tapered region and the second tapered region, wherein the first tapered region has an input diameter at the input end, the second tapered region has an output diameter at the output end, and the central region has a constant diameter that is larger than the input diameter and the output diameter, wherein the input diameter and the output diameter are each in a range from 50 to 200 micrometers, and wherein the cladding has a constant cladding diameter over the first tapered region, the central region, and the second tapered region.

16. The optical assembly of claim 15, wherein a nonlinearity parameter associated with the laser beam delivered to the process head satisfies a threshold that is based on one or more of a power level of the laser beam, a length of the monolithic delivery fiber, a value of the input diameter, or a value of the output diameter.

17. The optical assembly of claim 16, wherein the nonlinearity parameter includes a Raman gain, self-phase modulation, four wave mixing, or stimulated Brillouin scattering.

18. The optical assembly of claim 15, wherein the first tapered region and the second tapered region each has a length that is adiabatic for the laser beam delivered to the process head.

19. The optical assembly of claim 15, wherein the first tapered region expands monotonically along a length of the first tapered region, and wherein the second tapered region contracts monotonically along a length of the second tapered region.

20. The optical assembly of claim 15, wherein the input diameter is equal to the output diameter.

\* \* \* \* \*